US010056760B2

United States Patent
Colin et al.

(10) Patent No.: US 10,056,760 B2
(45) Date of Patent: Aug. 21, 2018

(54) ELECTRICALLY AUTONOMOUS INSTALLATION AND METHOD OF MANAGEMENT

(71) Applicant: BLUE SOLUTIONS, Ergue Gaberic (FR)

(72) Inventors: Jacques Colin, Quimper (FR); Christian Sellin, Concarneau (FR); Yvon Le Paven, Ergue Gaberic (FR); Jean Caron, Saint Eugene De Grantham (CA); Pierre-Luc Etienne, Saint-Constant (CA); Valery Florimond, Montreal (CA); Karim Sammouda, Chambly (CA); Alain Vallee, Varennes (CA)

(73) Assignee: BLUE SOLUTIONS, Ergue Gaberic (FR)

( * ) Notice: Subject to any disclaimer, the term of this patent is extended or adjusted under 35 U.S.C. 154(b) by 171 days.

(21) Appl. No.: 15/026,580

(22) PCT Filed: Oct. 3, 2014

(86) PCT No.: PCT/EP2014/071267
§ 371 (c)(1),
(2) Date: Mar. 31, 2016

(87) PCT Pub. No.: WO2015/049381
PCT Pub. Date: Apr. 9, 2015

(65) Prior Publication Data
US 2016/0248258 A1    Aug. 25, 2016

(30) Foreign Application Priority Data
Oct. 4, 2013    (FR) .................................. 13 59656

(51) Int. Cl.
*H02J 3/38* (2006.01)
*H02J 7/35* (2006.01)
(Continued)

(52) U.S. Cl.
CPC .............. *H02J 3/385* (2013.01); *H02J 7/35* (2013.01); *H02S 20/26* (2014.12); *H02S 40/38* (2014.12);
(Continued)

(58) Field of Classification Search
CPC .. H02J 3/385; H02J 7/35; H02S 20/26; H02S 40/38
(Continued)

(56) References Cited

U.S. PATENT DOCUMENTS

2006/0065597 A1    3/2006    Kunczynski

FOREIGN PATENT DOCUMENTS

DE    102010017264    12/2011
DE    102012202465    8/2012
(Continued)

OTHER PUBLICATIONS

French Search Report, dated Aug. 24, 2014, French Application No. 1359656.
(Continued)

*Primary Examiner* — John Poos
(74) *Attorney, Agent, or Firm* — Womble Bond Dickinson US (LLP)

(57) ABSTRACT

The subject of the invention is an installation (10) able to be electrically autonomous comprising elements to be powered (12, 20) from among which: —a building (12) comprising at least one room delimited by at least one wall and one roof, and —an electricity distribution terminal (20), situated outside the building and comprising means of connection for the connection to at least one external electrical apparatus,
(Continued)

the installation comprising means for powering the elements comprising: —means for generating energy (16) on the basis of a natural source, —means for storing energy (56), —means of interconnection (58, 62, 64) of the means of storage and/or of the means of generation to the elements to be powered, the installation also comprising: —means of measurement (72) of at least one parameter relating to the energy stored in at least one part of the energy storage means, and —means of control (66, 68, 67) of the means of interconnection as a function of the values obtained by the measurement means, so that if the energy stored in the at least one part of the storage means is less than a threshold value, the electrical powering of at least one of the elements (20) other than the building is prohibited.

27 Claims, 6 Drawing Sheets

(51) Int. Cl.
*H02S 20/26* (2014.01)
*H02S 40/38* (2014.01)

(52) U.S. Cl.
CPC ............... *Y02B 10/10* (2013.01); *Y02B 10/12* (2013.01); *Y02B 10/14* (2013.01); *Y02E 10/58* (2013.01)

(58) Field of Classification Search
USPC ........................................ 307/18, 19, 20, 21
See application file for complete search history.

(56) References Cited

FOREIGN PATENT DOCUMENTS

| | | |
|---|---|---|
| DE | 202013101180 | 4/2013 |
| EP | 2009763 | 12/2008 |
| WO | WO-2008138016 | 11/2008 |

OTHER PUBLICATIONS

International Search Report with English Language Translation, dated Dec. 4, 2014, Application No. PCT/EP2014/071267.

ELECTRICALLY AUTONOMOUS INSTALLATION AND METHOD OF MANAGEMENT

The present invention has as its object an installation capable of being electrically autonomous, such an installation including at least one building.

Buildings that are electrically autonomous are already known. Such buildings have in fact been developed for some years thanks to means for generating power based on a natural source (solar, wind, etc) with better and better performance. They generally include means for storing the energy produced.

These buildings are however generally located in places where they have the possibility of having access to the electrical grid, which allows them to have the same access to electrical comforts when their own means for generating electricity are inadequate.

The invention seeks to design an installation which can be put in place in an environment wherein no electrical reserve exists, so as to be able to offer a minimum of comfort to the local population.

One difficulty linked with such an installation is that the available electrical energy is likely to be limited, depending in particular on the climatic conditions which cannot be controlled according to the needs of the population.

It is therefore sought, within the scope of the invention, to perfect an installation wherein the maximum of electrical comfort is offered to the population when that is possible, while managing and economizing energy when that is necessary.

To this end, the invention has as its object an installation capable of being electrically autonomous comprising elements to be powered including:
  a building comprising at least one room delimited by at least a wall and a roof, and
  an electricity distribution terminal, located outside the building and including connection means for connection of at least one external electrical device,
the installation including means for powering the elements comprising:
  means for generating energy from a natural source,
  means for storing energy,
  means for interconnecting the storage means and/or the generation means to the elements to be powered,
the installation also including:
  means for measuring at least one parameter relating to the energy stored in at least one portion of the energy storage means, and
  means for controlling the interconnection means according to the values obtained by the measurement means, so that if the energy stored in the at least one portion of the storage means is less than a threshold value, electrical power supply to at least one of the elements other than the building is prohibited.

Thus, the installation according to the invention makes it possible to position collective buildings in isolated areas to improve the life of a community, such as a school or a dispensary, equipped with all the necessary objects, and add to it an electrical terminal allowing persons outside the building to use electrical devices from time to time using the energy produced by the installation if conditions allow it.

This electrical terminal is however only supplied with power only if the electrical energy available is sufficient for supplying the building with energy. It is thus assured that the basic functions of the installation are satisfied at all times and the implementation of supplementary functions is allowed when electrical energy generation conditions are good.

Such an installation is very advantageous because it makes it possible to better manage the electrical energy which is available to the community.

The installation according to the invention can also include one or more features of the following list:
  the means for storing energy include a plurality of energy storage assemblies in parallel, the measuring means being capable of measuring a parameter relating to the energy stored in each storage assembly. The installation preferably further comprises means for determining the energy stored in a plurality or the totality of the assemblies. Thus, the utilization of the two distinct energy storage assemblies in parallel makes it possible to improve the safety of the electrical grid and access to electricity by the building. Indeed, if one of the assemblies is no longer working correctly, one can in this manner use the other assembly(ies), at least for powering the devices carrying out the most essential functions, while waiting for assembly maintenance to be carried out on the defective assembly,
  the storage means include at least one battery module, particularly a battery of the lithium-metal-polymer type, wherein the electrolyte is in solid form. This type of battery, having a considerable life span and improved safety, is in fact particularly advantageous,
  the installation includes a plurality of sub-installations, each sub-installation including a distinct sub-group of means for generating energy and, when appropriate, of energy storage means, each installation being preferably connected electrically to at least one element to be powered or a portion of an element to be powered that at least one other sub-installation is not powering. A sub-installation can for example be connected to a portion of the building, another sub-installation being connected to another portion of said building. The sub-installations can also be connected to elements to be powered in common, such as the distribution terminal where each has different elements to be powered other than the building. One can also consider that each of the sub-installations is connected to distinct elements to be powered,
  at least two sub-installations are each electrically connected to a distinct portion of the building, at least one of the sub-installations being also connected to at least one other element to be powered other than the building, said sub-installation (or each of the sub-installations concerned) including:
    means for interconnecting storage means and/or generation means of said sub-installation to the elements to be powered;
    measuring means for at least one parameter relating to the energy stored in the energy storage means of said sub-installation, and
    means for controlling the interconnection means depending on the values obtained by the measuring means, so that if the energy stored in the storage means of said sub-installation is less than a threshold value, electrical power supply of at least one of the elements connected to said sub-installation other than the building is prohibited.
  at least one safety interconnection means is configured so that when it is activated, the energy coming from generation means of a first sub-installation supplies the element or the portion of the element to be powered belonging to a second sub-installation. The safety interconnection means makes it possible in particular to electrically connect a charger of a sub-installation with storage means of two sub-installations or the storage means of a sub-installation with elements to be powered or portions of elements to be powered belonging to the two sub-installations, the installation also includes a plurality of elements to be powered other than the building and means for measuring at least one parameter relating to the power demanded by each of these elements to be powered, and means for determining the element among the elements other than the building for which power supply is prohibited based on the values obtained by said measuring means. It is thus possible to prohibit or stop power supply to the non-priority element which is the biggest power consumer, when the energy stored is considered to be less than the threshold value, it is possible to alternatively disconnect the elements in a predetermined order according to their usefulness to the community, the energy generation means comprise at least one photovoltaic panel capable of converting solar radiation to electrical energy. These means of energy generation can also comprise a wind turbine, a hydraulic turbine, etc. The means of generation can also include several elements for generating energy of the same nature or of a different nature, in series and/or in parallel, at least one of the photovoltaic panels, preferably the totality of the photovoltaic panels, is placed on the roof of the building so as to avoid the use of an additional structure and to maximize the exposure of these panels while still also avoiding vandalism or unintentional breakage. The building then includes in particular a single-pitch roof and the orientation (south or north depending on the hemisphere) is selected to optimize the operation of the photovoltaic panels, the surface area of the photovoltaic panels and particularly of the roof is selected so that the photovoltaic panels can supply the building with electricity for 24 hours without interruption. In other words, the panels can supply more than 60 kWh, and in particular approximately 80 kWh from one day of insolation. The planned surface area of the panel, and particularly of the roof, therefore greater than 100 m$^2$ and in particular 120 m$^2$, at least one charger comprising a power converter is placed downstream of the energy generation means, and in particular interposed between the energy generation means and the means for storing energy. This charger can include a DC converter, particularly downstream of the photovoltaic panels generating DC current, or an AC/DC converter, for example downstream of a wind turbine generating AC current. The charger preferably includes the MPPT (maximum power point tracking) feature. This operation has the purpose of seeking out the maximum power point of the generation means formed by the photovoltaic panels, due to the fact that these are nonlinear, meaning that for the same insolation, the power delivered by these panels is different depending on the voltage selected. A charger can be placed at the output of a panel or of a plurality of panels placed in series and/or in parallel, an DC/AC converter (or inverter) is placed between the energy generation means and the elements to be powered, particularly at the output of the energy storing means, so as to transform the current stored in the energy storage means in direct form into current distributed in alternating form, to which commercial electrical equipment which are likely to be found in the building is adapted. Such a converter can in particular be placed at the output of each of the energy storage assemblies, the energy generation means are connected both to energy storage means and directly to at least one of the elements to be powered and particularly to the building. Indeed, this makes it possible to satisfy directly the needs of the building without unnecessary loss of energy (losses, even minimal losses which must occur when the energy storage means are charged and discharged). The energy generated is also immediately available in this manner, the installation can also be connected to another, emergency, power supply means, such as a generator set or a distribution grid, designed to supply at least one of the elements to be powered and/or the energy storage means. In the case where the installation includes such an emergency power supply means, the installation can include a rectifier interposed between at least the power supply means and the energy storage means, or at least one storage assembly to be able to store (as DC current) in these means the energy obtained from the power supply means (as AC current), the electricity distribution terminal includes a connection detection means for the presence of an electrical device to the connection means of the terminal, and means for controlling the interconnection means interposed between the terminal and the energy storage means depending on the detection means. It is thus possible to ensure the safety of the electricity distribution terminal, no current circulating in this terminal if no device is connected thereto, The terminal can include an identification module and/or a payment module. An identification module, using in particular a card such as an RFID, bar code or magnetic stripe card, possibly reinforced by a personal identification code, ensures that the service will be used only by authorized members. The terminal could also be used by any person (or any person who wishes to) using the payment module. Such a module is in particular a conventional payment module by bank card or by pre-payment card or by means of a coin or banknote collector. In this case, the control means can control the interconnection means interposed between the terminal and the energy storage means depending on the identification and/or payment modules. The electrical energy is in fact delivered only if an identified user connects a device or if a user has paid for the service. Alternatively, the terminal can include access means movable between a closed position allowing access to the connection means to be blocked, and an open position allowing free access to the connection means, and control means for the access means depending on the identification and/or payment means. In the case where the terminal includes a payment module, it can also include an energy meter for the energy supplied to each of the connection means, the meter interacting with the payment means so that one of the two members controls the interconnection means and thus the interruption of the delivery of electricity once the sum paid in advance is consumed. Of course, the terminal can also have free access.

access to or delivery of current in a connection means can also be controlled depending on the parameter relating to the power measured at the output of the energy storage means. In other words, the installation includes means for controlling the interconnection or access means relating to at least one connection means of the terminal depending on the parameter relating to the energy available in the energy storage means. In this manner, the delivery of current to a new outside device is not allowed if it is detected that the energy storage assemblies are near their limiting charge level, another element to be powered by the installation is a water treatment unit such as a water purification element and/or seawater desalination unit. Other elements or several elements of the same nature can of course be added to the installation. The water treatment unit includes in particular a fluid output channel connected to the building and is designed to supply the latter with water. It can also be connected to a liquid distribution terminal located outside the building and including means for delivering liquids such as a faucet. It is then possible to make water, as well as electricity, available to all.

the liquid distribution terminal can also include an identification a/or payment module and possibly access means movable between a closed position allowing access to the delivery means to be blocked and an open position allowing free access to the output means, and control means for the access means depending on the identification module and/or payment means. As for the electricity distribution terminal, the water distribution terminal is then accessible only to persons who are authorized or who wish to pay, which avoids wastage of the rare goods, the installation can also include means for opening and closing at least one fluid channel, such as at least one valve, and means for controlling opening and closing depending on at least one parameter so that only the building is supplied with water when the value of the parameter is outside a certain range of threshold values. The parameter can in particular be a flow rate of water required by the building (access to the terminal refused if it is greater than a threshold value) or a quantity of treated water available (access to the terminal refused of it is less than a threshold value).

The invention also has as its object a method for managing an installation capable of being electrically autonomous, including elements to be powered, including:

a building comprising at least one room delimited by at least a wall and one roof, and an electricity distribution terminal, located outside the building and including means of connection for the connection of at least one external electrical apparatus, the installation including means for powering elements including:

means for generating energy from a natural source,
means for storing energy,
means for interconnecting storage means and/or energy generation means with elements to be powered, the method including the following steps:

at least one parameter relating to the available energy in at least one portion of the energy storage means is measured, and the interconnection means are controlled depending on the values measured, so that if the energy available in the at least one portion of the storage means is less than a threshold value, power supply to at least one of the elements to be powered other than the building is prohibited.

A non-limiting embodiment of the installation according to the invention will now be described, using the drawings, wherein.

Figure 1:
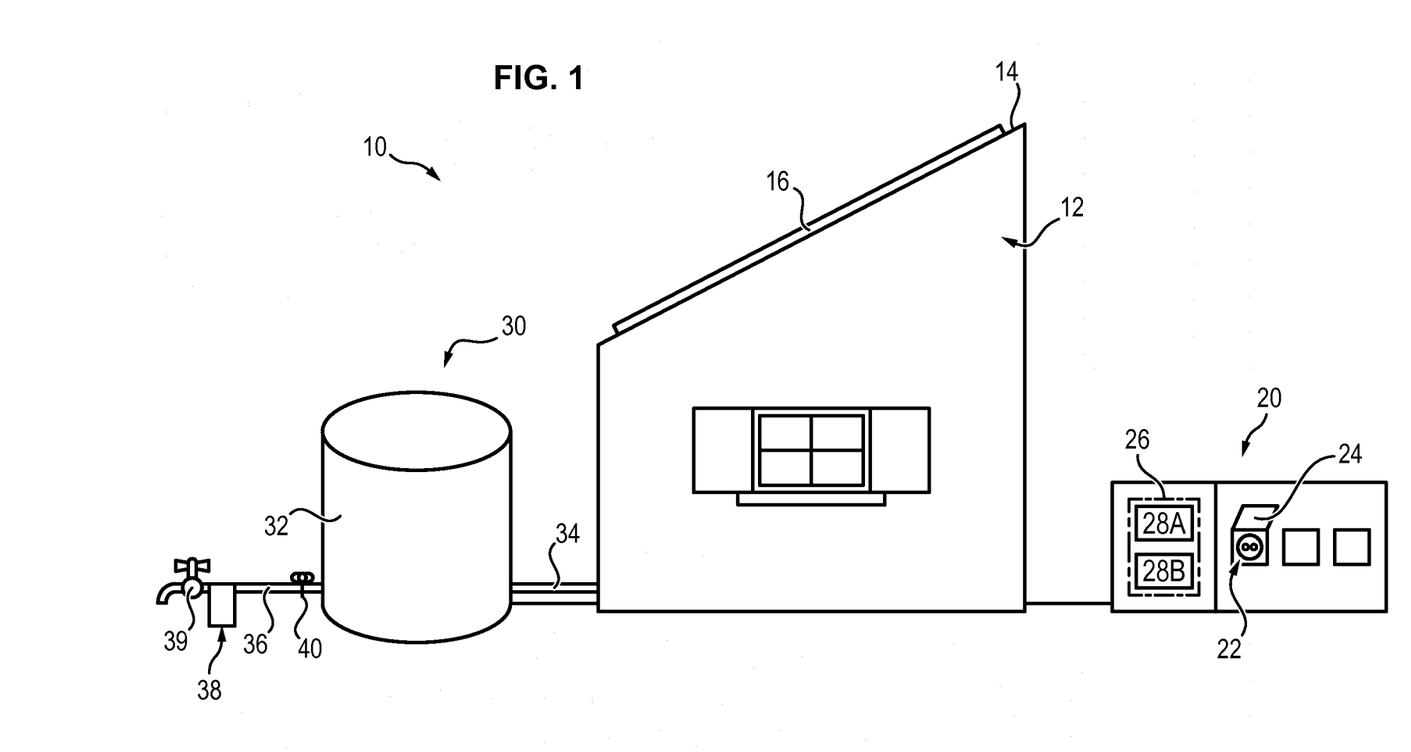
FIG. 1 is a schematic view of the installation according to a particular embodiment of the invention.

In FIG. 1, an installation 10 according to one embodiment of the invention is seen. The installation includes, first of all, a building 12 designed generally to serve as a public service building in the community where it is installed, for example a dispensary or a school. This building includes a roof 14 on which are positioned photovoltaic panels 16 designed to transform solar radiation into electrical energy. To maximize the energy collected by the photovoltaic panels, the roof 14 includes a single pitch and is oriented toward the south in the northern hemisphere and toward the north in the southern hemisphere. Its tilt can be designed based on the area where the installation is situated to maximize the effectiveness of the panels.

The installation also includes, besides the building 12, an electrical distribution terminal 20 connected to the building 12. This terminal includes a plurality of connection means 22 allowing connection to the terminal of external devices such as telephone chargers, computers, etc. Three emplacements for connection means are shown on the figure. Each of these connection means is located in a housing covered by a flap 24 movable in rotation between a closed position wherein it prevents access to the connection means and an open position wherein it allows access to such connection means. This flap can be latched in the closed position using magnetic latching means in particular. Preferably, the housing is of sufficiently large dimensions to be able to insert the external devices into it and ensure safety against theft of these devices during their connection to the terminal.

The electricity distribution terminal 20 also includes a user communication interface 26 including in particular a screen and a data entry keyboard. It also includes an identification module 28A (bar code or RFID reader) and a payment module 28B (conventional module for bank card payment for example). This interface 26 allows the user to interact with the terminal in order to be able to gain access to the electricity distribution service.

The installation also includes a water treatment unit 30 also connected electrically to the building 12. This water treatment unit makes it possible to purify or desalinate non-potable water near the installation. The water treatment unit includes a reservoir 32 capable of storing purified water and water output channels 34, 36 leading on the one hand into the building 12 to supply it with water and on the other hand toward a water distribution terminal 38 including means for water supply such as a faucet 39 and allowing members of the community wherein is located in the installation to also supply themselves with water if necessary. The installation also includes a control valve 40 located between the reservoir 32 and the fluid supply means 39 allowing or preventing passage of fluid in this channel.

The valve 40 can be controlled based on a parameter relating to the treatment unit, particularly the quantity of water available in the reservoir so that, if the quantity is less than a threshold value, the valve is closed and water can be distributed only to the building 12. If the quantity is greater than the threshold value, however, the valve allows the water to be distributed with free access to the faucet 39. Thus water is protected for supplying the building as a priority.

The water treatment unit 30 has been presented as having free access, so that the faucet 39 can be accessible to the entire community. It will be noted however that this faucet could be coupled with means of identification and payment as described for the electricity distribution terminal, so that access to the terminal is selective. In contrast, the electricity distribution terminal can have free access.

The operation of an electrically autonomous installation like that of the invention will now be described with the help of FIG. 2. So as not to uselessly complicate the description and the associated schematic, we have shown on the schematic only the building 12 and the electricity distribution terminal 20.

As has already been indicated, the electrical energy serving to supply the different elements described, and particularly the building 12 and the electricity distribution terminal 20 is produced by photovoltaic panels 16 placed particularly on the roof of the building and of which two examples connected in parallel are shown in the figure.

A charger 50 including in particular a DC converter 52 is placed downstream of the panels 16 so as to be connected to these two panels. The DC converter makes it possible to adapt the energy produced into energy suitable for being used by the installation. Preferably, the charge is an MPPT (maximum power point tracking) charger, meaning that it selects the voltage at which the panels must operate to produced the maximum power, such panels constituting nonlinear generators, meaning that for the same insolation the power delivered by these panels is different depending on the voltage at which they operate.

A non-limiting operating mode for such an MPPT operation consists of:
  measuring the power P1 delivered by the panels for a fixed output voltage U1,
  after a certain time, imposing a second voltage U2 slightly greater than U1, and measuring the corresponding power P2, and
  if P2 is greater than P1, attempt to impose an even greater voltage (smaller, respectively if P2 is less than P1).

Thus the charger constantly adapts the voltage at the terminals of the photovoltaic panels so as to approach the maximum power point.

At the output of this charger are found two electrical branches in parallel. A first branch includes an inverter 54 downstream of which are connected in parallel the building 12 and the terminal 20. Between the inverter 54 and the distribution terminal 20, the installation also includes interconnection means 64 consisting of a switch and allowing current to be delivered or not delivered to the electrical distribution terminal 20, which is not considered as needing to be powered as a matter of priority. This branch makes it possible to directly supply the building 12 and possibly the terminal and to satisfy its needs in real time with the energy obtained from the photovoltaic panels 16. The inverter 54 makes it possible to transform the electrical energy produced in DC current into electrical energy in AC current generally used by electrical installations.

The second branch includes energy storage means 56 consisting of a module of batteries generally including several battery cells in series. Conventionally, each elementary cell includes and anode and a cathode and an electrolyte allowing transfer of chemical compounds between the two electrodes, so that a reduction-oxidation reaction occurs in the cell. The battery is preferably a lithium battery and particularly a lithium-metal-polymer battery having an electrolyte in solid form when the battery is at rest. Such a battery module is in fact especially advantageous in terms of safety and life span.

Downstream of the battery, the second branch also includes interconnection means 58, consisting of a switch and an inverter 60. This branch is connected in parallel and, downstream of the inverter, to the building 12 on the one hand and the electricity distribution terminal 20 on the other hand. Between the inverter 60 and the distribution terminal 20, the installation also includes interconnection means 62 consisting of a switch and allowing current to be delivered, or not to be delivered to the electricity distribution terminal 20 through the battery module.

The electrical circuit also includes control means 66, 67, and 68 for the respective interconnection means 58, 64, 62. These control means make it possible to control the closing or opening of the switch (hence the authorization or prohibition of delivering current into the branch in question) according to parameters measured in the circuit or in other areas of the building or of the terminal.

The circuit also includes measuring means 70, 72 making it possible to measure respectively the current in the first output branch of the charger 50 and the allowable discharge current at the output of the battery, which makes it possible to obtain information on the charge of the battery and the energy that it can still supply. These measuring means 70, 72 are capable of communicating with the control means 66, 67, 68 of each of these switches 58, 64, 62 which take into account the data supplied by these measuring means to control the switches. More particularly, the measuring means 70 are designed to communicate with the control means 66 of the switch 58 while the measuring means 72 are capable of communicating with the control means 66, 67, 68 of the switch 58, 64, 62. The measuring means 70 can of course be integrated in the MPPT charger 50 while the measuring means 72 can be integrated in the battery module 56.

Such an installation makes it possible to best manage the available electrical energy. Thus, at the output of the charger 50, the electrical energy is sent into the building solely to respond to immediate electrical needs. The rest of the available energy is stored in the battery. The terminal 20 is not supplied with this energy because it is not considered to have priority, unless a surplus of energy is available.

Figure 3:
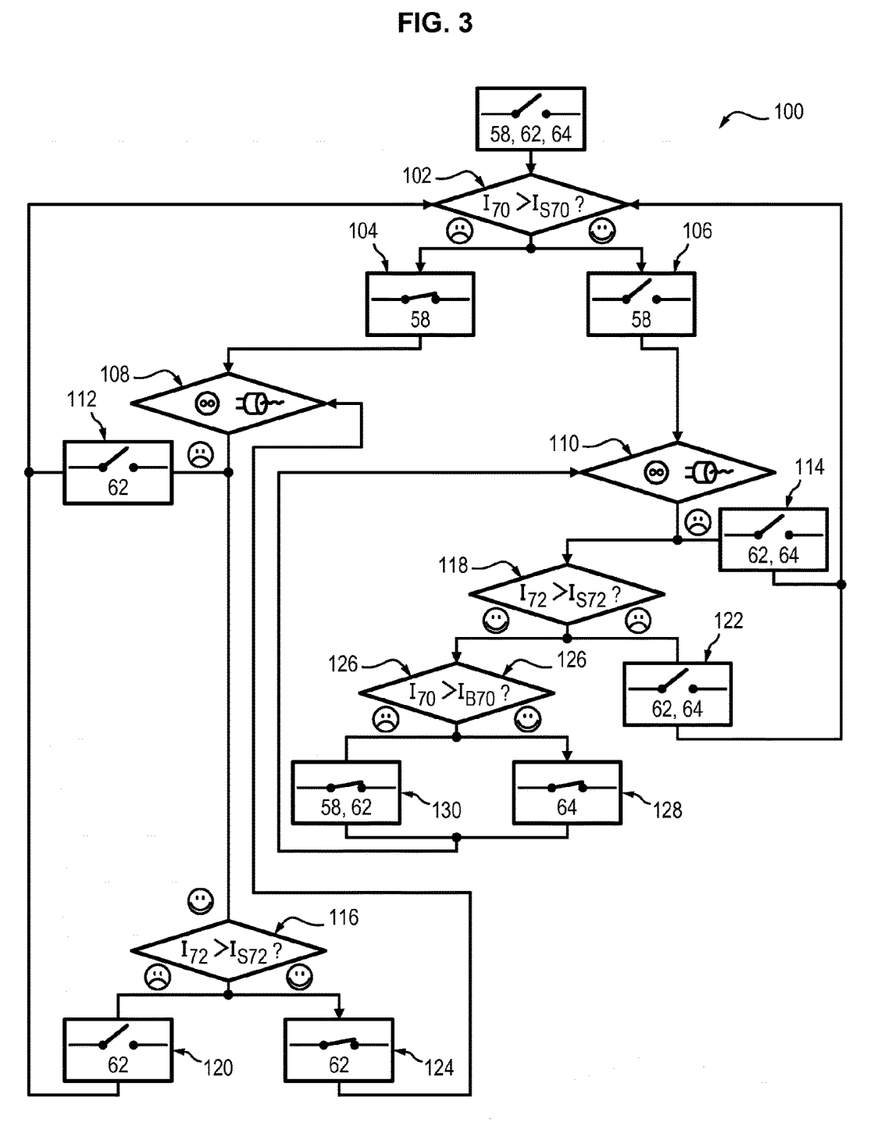
FIG. 3 is a diagram of a control method implemented in the electrical circuit of FIG. 2.

The operating method 100 of the installation of this first embodiment will now be described in detail with the help of FIG. 3.

The intensity of the current in the first branch of the circuit is measured in real time using the means 70 and it is compared, during a step 102, the intensity $I_{70}$ measured in this branch to the threshold value $I_{S70}$. This comparison is carried out by means of a calculation unit 73 such as a microprocessor in communication with the measuring means 70. It will be noted that the threshold intensity $I_{S70}$ can have a fixed value or a value relative to power required by one or several elements to be powered, or an intensity measured in the circuit, particularly in the electrical branch leading to the building 12.

When it is considered that the current delivered by the solar panels is no longer sufficient to supply the building with power, that is when it is measured that the current in the first branch is less than the threshold value $I_{S70}$, the calculation unit 73 communicates it to the control means 66 of the switch 58, to which it is connected, these means controlling the closure of the switch 58 during step 104 so that the energy coming from the battery is able to supply power to the building 12. The battery module 56 which was in "charging" mode then changes to "discharging" mode. In the reverse case, the control means are ordered to allow the switch 58 to remain open during a step 106. As a variant, one could measure the current in the second current branch upstream of the battery and close the switch 58 as soon as the current in the branch upstream of the battery 58 is zero, which signifies that all the energy produced by the solar panels is already used to supply the building.

It is then verified whether it has been detected (step 108, respectively 110) that a user was trying to connect a device to the electricity distribution terminal. If no connection has been detected, the opening of the switches is ordered, allowing the terminal, 58 and/or 62 and/or 64 to be powered, during a step 112, respectively 114.

If on the other hand a connection has been detected, then in both cases, during a step 116 respectively 118, it is verified whether the intensity of the discharge allowable at the output of the battery $I_{72}$ measured by the means 72 is greater than a certain threshold value $I_{S72}$, particularly 3.0 V. This intensity makes it possible to deduce the level of charge of the battery, thus the known energy stored in the battery and the threshold intensity therefore corresponds to a threshold value of the energy stored in the battery. If this is not the case, the control means 68 are ordered, during a step 120, respectively 122, to leave the switches 62 and possibly 64 open. If this is the case, it is however considered that the installation is storing enough energy to supply the building during an entire day and that the stored electrical energy can be used for the terminal.

In the case where the battery is already necessary to supply the building, it is also verified, during a step 126, whether the intensity $I_{70}$ in the branch of the inverter 54 is greater than a second threshold value $I_{B70}$ greater than the first threshold value $I_{S70}$. If this is the case, this branch is used for powering the terminal and closing of the switch 64 is ordered using the means 67, during a step 128. In the contrary case, the battery module must be used to supply the terminal 20. During a step 130, closure of switches 58, 62 is ordered using control means 66, 68. The battery changes from the "charging" mode into the "discharging" mode. During step 130, it is also possible to order the closure of the switch 64 to avoid any loss of energy.

This method is carried out constantly depending on the values measured by the measuring means, which are sent in real time to the calculation module 73.

Figure 4:
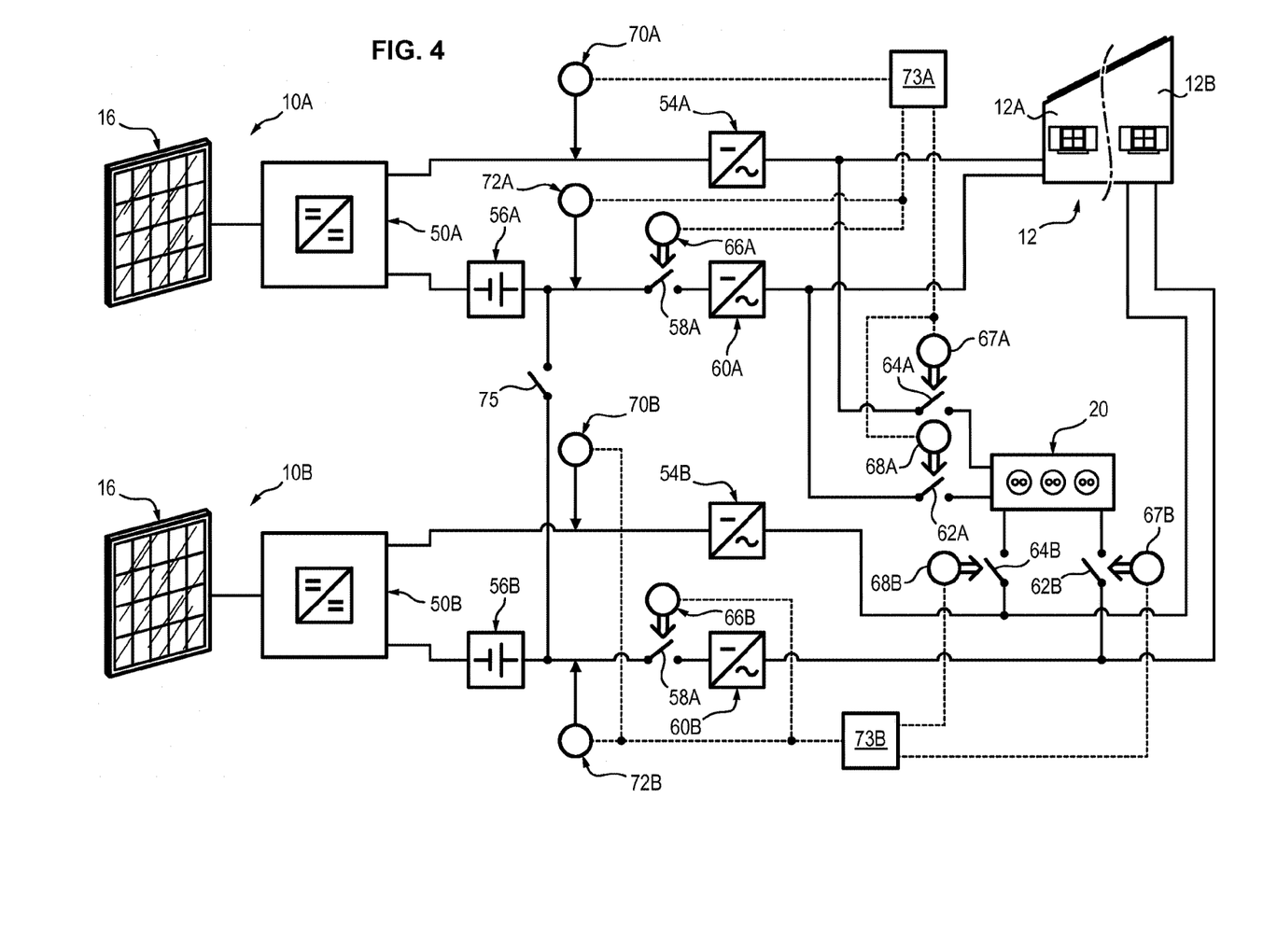
FIG. 4 is a simplified schematic of the electrical arrangement of a variant of the installation according to the embodiment of FIG. 2.

A variant of an electrical circuit of an installation according to the invention is shown in FIG. 4. The same electrical members have been shown with the same references.

Figure 2:
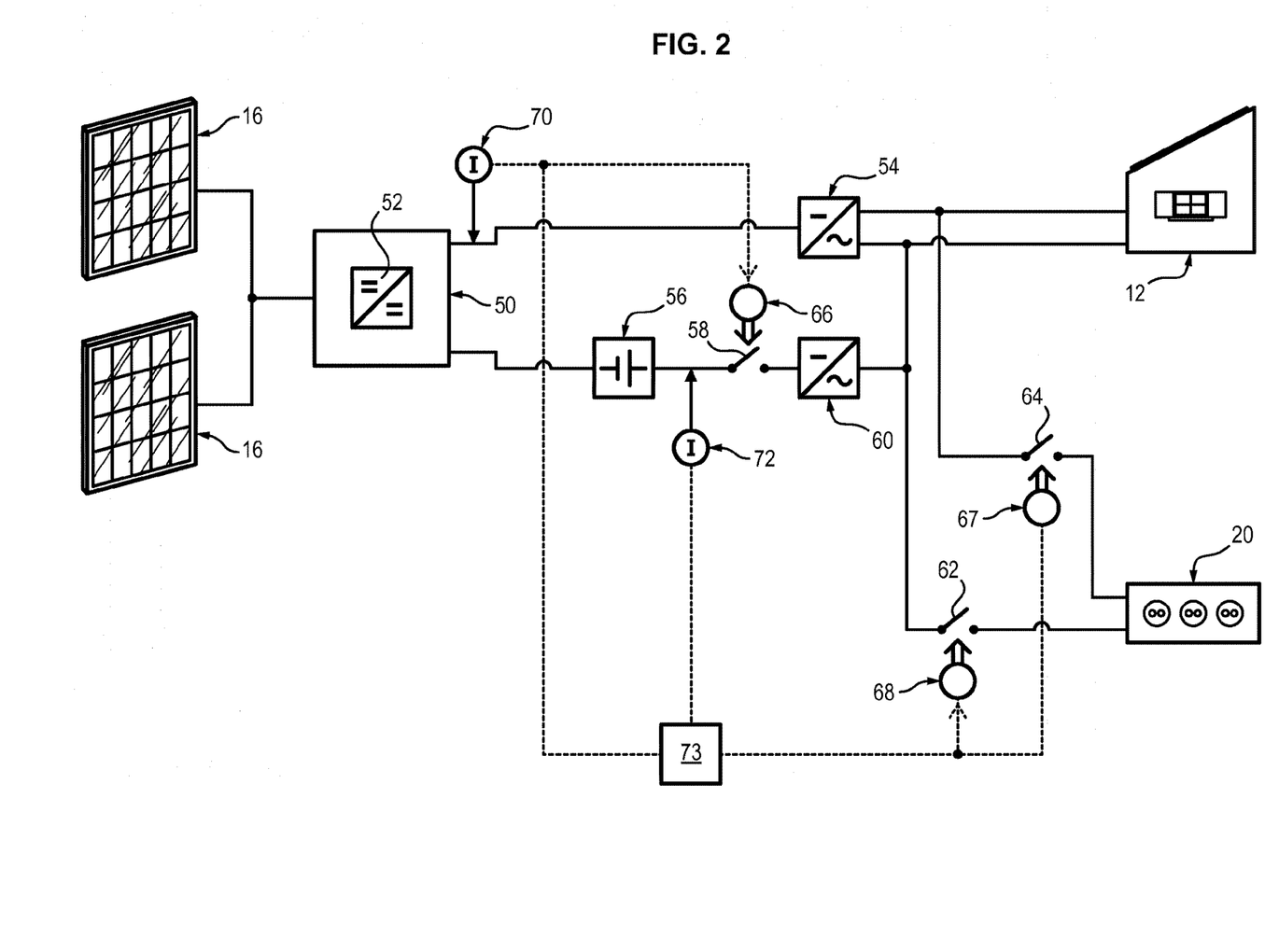
FIG. 2 is a simplified schematic of the electrical arrangement of an installation according to one embodiment of the invention.

As can be seen in this figure, the installation includes two sub-installations called here half-grids 10A, 10B, completely identical and also identical to that described in FIG. 2. Each of these half-grids 10A, 10B includes at least one photovoltaic panel 16, a charger 50A-50B, a first branch connected to the elements to be powered through an inverter 54A-54B, and a second branch including a battery module 56A-56B also connected to the elements to be powered through an inverter 60A-60B.

The electrical members of these two sub-installations are distinct, in that a member of one sub-installation does not belong to the other sub-installation.

The difference, relative to the installation in FIG. 2 and each of the half-grids 10A, 10B is that each half-grid 10A, 10B supplies a distinct portion 12A, 12B of the electrical grid of the building 12.

Each of the two half-grids also include interconnection means 58A, 62A, 64A; 58B, 62B, 64B, measuring means 70A, 72A; 70B, 72B and control means 66A, 67A, 68A; 66B, 67B, 68B for the interconnection means which control the interconnection means relating to this half-grid depending only on the values of the measurements carried out in this half-grid. Thus, the two half-grids are not required to communicate and can be completely independent of one another, which leads to improved safety.

However, it will also be noted that the two half-grids are connected by a transverse branch including a safety switch 75 connecting the two battery modules 56A, 56B. This switch can be activated manually in the event of a failure of one of the half-grids. In this case, in the case of failure of one of the chargers, the two batteries are in series and can be charged by the photovoltaic panels of the same half-grid when they are in "charging" mode. If one of the batteries has failed, it is also possible thanks to this switch to supply the entirety of the building thanks to the energy stored in only one of these battery modules when the latter is in the "discharge" mode. The switch 75 could also of course be controlled automatically depending on different measured parameters instead of manually.

Figure 5:
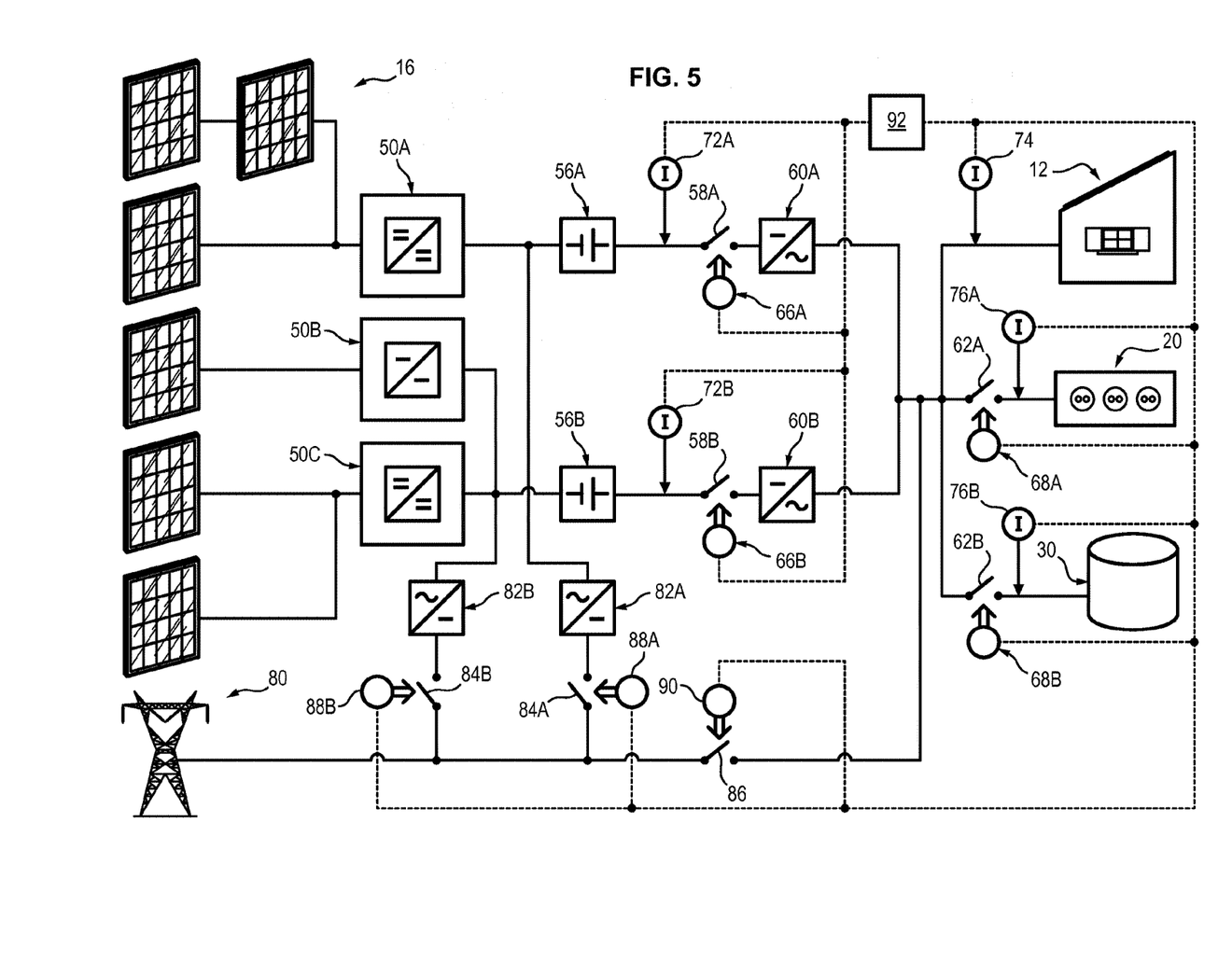
FIG. 5 is a simplified schematic of the electrical arrangement of an installation according to another embodiment of the invention.

We have shown another embodiment of an installation according to the invention in FIG. 5. The same electric members have been shown with the same references.

It is shown in this figure that the photovoltaic panels 16 can be arranged in multiple fashions upstream of the chargers 50. We have shown in the figure three chargers 50A, 50B and 50C, the charger 50A being connected to two panels in series, in parallel with another panel. The charger 50B is for its part connected to a single panel while the charger 50C is connected to two panels in parallel as in FIG. 2. Preferably, however, the installation is symmetrical, meaning that each charger is connected to the same number and arrangement of panels.

The circuit of FIG. 5 also includes two battery modules 56A, 56B instead of a single module as in FIG. 2. These battery modules are located on parallel electrical branches. In particular, the first battery module 56A is located downstream of the charger 50A while the second battery module 56B is located downstream of the chargers 50B and 50C. The battery modules 56A, 56B can in fact be connected to any number of chargers in parallel. Just as before, it is preferably that the installation be symmetrical and that each of the battery modules is connected to the same number of chargers.

Again, the two battery modules receive their energy from distinct photovoltaic panels. This makes it possible to create two electrical half-grids which can operate cooperatively (alternately or at the same time) and to increase the safety of the grid because if one battery module, or an associated charger, can no longer operate correctly, the installation can still be supplied with electricity thanks to the parallel grid including the second battery module.

As described above for FIG. 2, interconnection means of the switch type 58A, 58B and an inverter 60A, 60B are placed downstream of each of the battery modules. Also as in FIG. 2, each electrical branch including a battery module is connected to the elements to be powered, here the building 12, the electricity distribution terminal 20 and the water treatment unit 30, arranged in parallel. Interconnection means 62A, 62B are placed in the respective electrical branches designed to connect the distribution terminal 20 and the treatment unit 30.

Unlike what was described in FIG. 2, it is noted that the electrical energy is not, in this example, brought directly from the photovoltaic panels toward the elements to be powered. This configuration, even though it is advantageous, is not in fact compulsory. On the other hand, the electrical circuit includes an additional electrical branch connected to an electrical grid 80 potentially accessible from the installation. Instead of the grid, it is also possible to connect the installation to a generator set.

The electrical grid 80 is connected on the one hand to the elements to be powered 12, 20, 30 and on the other hand, through two other branches, to each of the battery modules 56A, 56B. Each of these branches connecting the grid to the battery modules also includes a rectifier 82A, 82B, such a rectifier being an AC/DC converter allowing AC current coming from the grid into DC current capable of being stored in the storage means 56A, 56B, and interconnection means 84A, 84B consisting respectively of a switch. Interconnection means 86 are also placed in this electrical branch connected to the grid so as to connect or disconnect the grid from the elements to be powered 12, 20, 30.

As in FIG. 2, control means are associated with each of these switches. The control means 66A, 66B are associated with each of the switches 58A, 58B and control means 68A, 68B are associated with the switches 62A, 62B. Control means 88A, 88B and 90 are respectively associated with the switches 84A, 84B and 86.

The circuit also includes measuring means 72A, 72B, particularly for measuring the intensity at the output of each of the battery modules, as well as measuring means 74 for the intensity in the electrical branch to the building and measuring means 76A, 76B, particularly for the intensity in the respective electrical branches relating to the distribution terminal 20 and the treatment unit 30.

Now the electrical circuit of this installation according to this embodiment functions will be explained, with the help of FIG. 5. Switches 62A, 62B, 82A, 82B, 86 are open by default.

The discharge currents allowable at the output of each of the battery modules are also measured in real time in the circuit described above.

Figure 6:
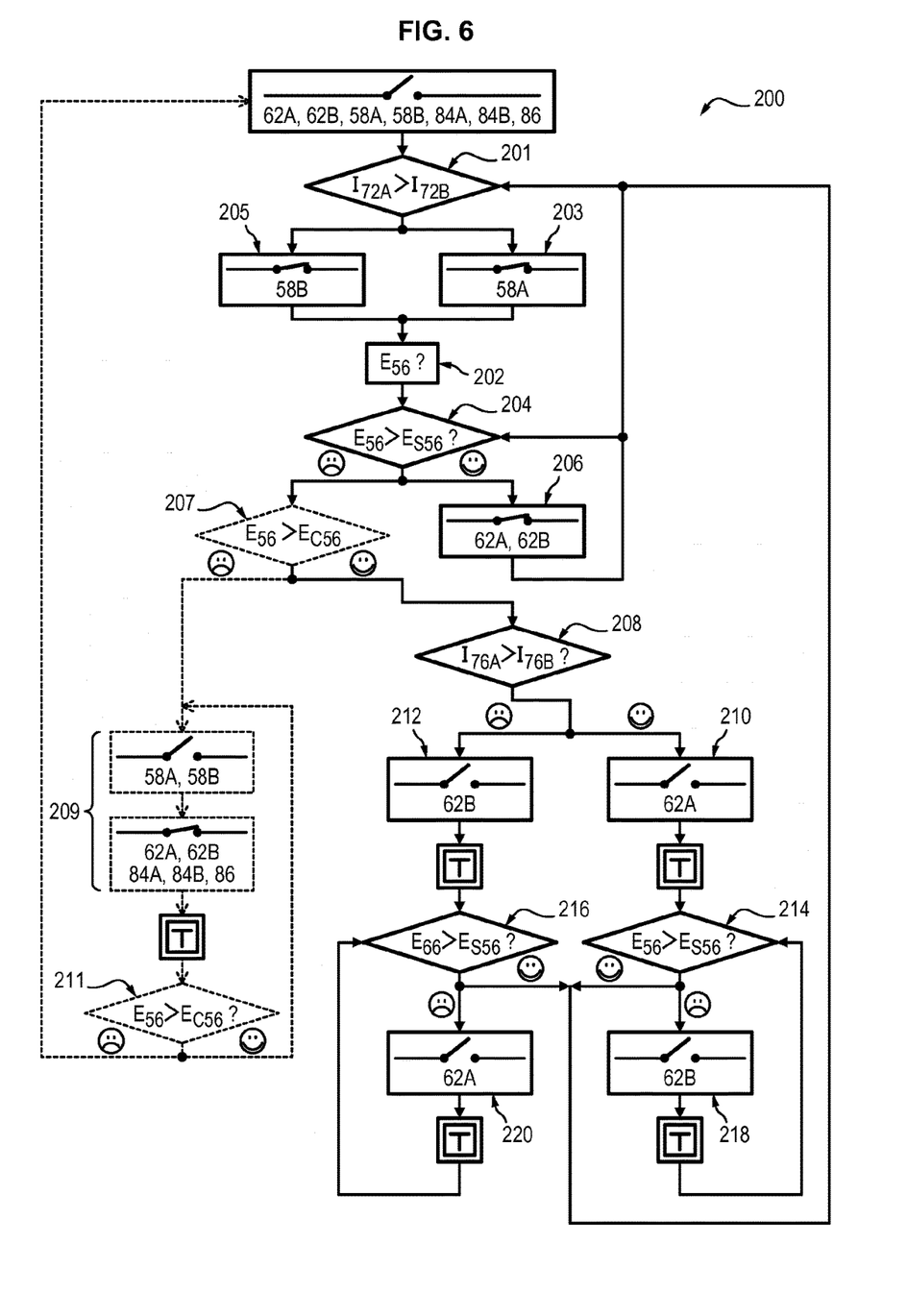
FIG. 6 is a diagram of a control method implemented in the electrical circuit of FIG. 5.

We start in the method 200 by determining which battery module is that containing the most available energy. This step is carried out by comparing, in step 201, the intensities of discharge $I_{72A}$, $I_{72B}$ at the output of each of the battery modules 56A 56B. This operation is carried out using measuring the means 72A, 72B. Depending on the result of this comparison step 201, during a respective step 203, 205, the closure of the switch 58A, 58B at the output of the battery module 56A, 56B which holds the most energy, to wit has the highest discharge intensity, is ordered. The battery module associated with the closed switch then passes into the "discharging" mode and is dedicated to powering the elements while the other module remains in the "charging" mode and stores the energy produced by the photovoltaic panels 16.

During step 202, using a calculation module 92 in communication with the measuring means, the level of charge and the available energy $E_{56}$ in the two battery modules is then determined. This datum $E_{56}$ is then compared to a threshold value $E_{SS6}$ during a step 204. The different switches are then controlled according to this datum. The control means 66A, 66B, 68A, 68B, 88A, 88B, 90 are in fact in communication with the calculation module. If it is determined that there subsists sufficient energy in both of the two battery modules, the switches 62A, 62B are closed, during a step 206, while the determined switch 58A, 58B remains closed and the switches 84A, 84B, 86 relating to the grid remain open so that the grid is disconnected from the installation. This operation is not compulsory, the battery modules charging and discharging at the start of the installation can always be the same ones, or selected to reverse their roles at each start.

When the parameter relating to the energy stored in both of the two batteries passes below this threshold value $E_{SS6}$, the intensity measurements $I_{76A}$ and $I_{76B}$ are obtained from the means 76A, 76B to compare and determine which elements of 20, 30 consume the most energy during a step 208. The opening of the switch 62A, 62B of the branch which consumes the most energy is then ordered based on the result of the comparison, during steps 210 or 212 respectively. Alternatively, it is possible, without measuring the intensity in the two branches, to automatically control the disconnection of a switch considered to have low priority, particularly 62A.

It is then possible to wait for a certain time T to possibly allow enough time for the battery module to recharge itself. If at the end of this time (1 hour for example), the energy stored $E_{56}$ in all the batteries (obtained with the measuring means 72A and 72B) is again compared to the threshold value $E_{SS6}$ during respective step 214 and 216. If the energy available in both of the two battery modules is still insufficient, the control means 68A, 68B order the opening of the other switch 62A, 62B still closed during the respective step 218, 220. Here again a waiting period T is left before verifying again if the available energy $E_{56}$ is greater than the threshold energy $E_{SS6}$. If this is not the case, the switches 62A, 62B remain open. Otherwise, the two switches are closed.

It is also possible to consider that if the parameter $E_{56}$ is less than a second threshold value, called the critical value $E_{C56}$, lower than the threshold value $E_{SS6}$ (optional step 207), the connection of the electrical grid to the installation is ordered and the closure of switches 84A, 84B, 86, as well as the switches 62A, 62B. Switches 58A and 58B are then open, to ensure optimal charging of the battery modules, during the group of optional steps 209. After a waiting period T, the available energy $E_{56}$ is again compared with the critical value. If the energy available has gone back above the critical value, the method is re-initialized. Otherwise, the circuit is left as is for another period T.

Of course, only two embodiments of the installation and the associated operating procedure have been described. There exist many others. The installation could for example include in combination a single battery module and a connection to an electrical grid. It could also include a plurality of battery modules forming a single grid or several independent grids and coupled with an electricity distribution grid.

The electric circuit of the installation is of course also not limited to what has been described above. The number of chargers, panels or battery modules is not limited to what has been described. Likewise, the number and the type of elements to be powered are not limited to what has been described. The electrical connections can also be different from what has been described: for example, in the case where the electrical circuit includes two battery modules in parallel, each battery can be connected to one element in particular to be powered. Two batteries can also be connected to the same inverter even if it is then preferably to have them operate alternately.

The method is not limited to what has been described. The steps could be carried out in a different order, the threshold values could also be different, as well as the parameters measured. Other values and other conditions could also be processed.

The operation of the electricity distribution terminal will now be quickly described.

As has been indicated, the electricity distribution terminal includes different connection means 22 to connect to external devices. At rest, the switch 62A, or switches 62, 64 are open, meaning that the terminal is disconnected from the circuit. When a user wishes to connect to the terminal, it asks him to identify himself by presenting a means of identification (magnetic, RFID or bar code card) and possibly by entering an identification code. If he is correctly identified, the terminal gives the user the authorization to connect an external device. If this is not the case, it will ask him to pay, particularly by inserting a card in the payment module. Once the card is presented, the authorization to withdraw electricity is given to the user. If the card is not presented or is not valid, the process ends here.

If authorization is obtained, the terminal communicates with means of the calculation means type 92 of the installation to verify the parameter relating to the energy of the batteries and measured using means 72, 72A, 72B. If the parameter is lower than the threshold value, it is indicated to the user that he has been correctly identified but that it is not possible at present to withdraw electricity. If, however, it is greater than the threshold value, the terminal controls the latching means of the flap 24 of one of the connection means so that the user can insert the power plug relating to his/her device, and preferably his/her device into the housing.

When the terminal detects the connection of the external device's plug to the connection means, all conditions are finally met and it orders the control means 68, 68A to close the switch 62, 62A and connect the terminal to the installation.

The magnetic latching means of the flap are then closed so as to avoid having the device located inside the housing and the connection means accessible to third parties. To recover his device, the user can identify himself again or present his bank card and the terminal will allow the opening of the flap by deactivating the magnetic latching means. The delivery of current can be stopped once a meter indicates that the energy for which payment has been made is consumed.

Obviously, the terminal is not limited to what has been described. It can in particular have none of the safeties and means of identification or payment presented, or only a few of them.

It will also be noted that access to the water distribution terminal 38 can also be managed like the access to the electricity distribution terminal.

The description of the invention as carried out above has obviously been carried out only by way of examples and does not exclude any variant within the scope of the claims presented hereafter.

The invention claimed is:
1. An installation (10) capable of being electrically autonomous including elements to be powered (12, 20, 30) including:
  a building (12) including at least one room delimited by at least a wall and a roof (14), and
  an electricity distribution terminal (20) located outside the building and including connection means (22) for connection of at least one external electrical device,
  the installation including means for powering the elements comprising:
  means for generating energy (16) from a natural source,
  means for storing energy (56; 56A, 56B),
  means (58, 62, 64; 58A, 58B, 62A, 62B) for interconnecting the storage means and/or the generation means to the elements to be powered,
  the installation also includes:
  means (72; 72A, 72B) for measuring at least one parameter ($I_{72}$; $I_{72A}$, $I_{72B}$) relating to the energy stored in at least one portion of the energy storage means, and
  means (66, 68, 67; 66A, 66B, 68A, 68B) for controlling the interconnection means depending on the values obtained by the measuring means, so that if the energy stored in the at least one portion of the storage means is less than a threshold value, electrical power supply to at least one of the elements (20, 30) other than the building is prohibited, wherein the energy storage means include a plurality of energy storage assemblies (56A, 56B) in parallel, the measuring means (72A, 72B) being capable of measuring a parameter relating to the energy stored in each storage assembly, the installation including in particular means (92) for determining the energy stored in a plurality or the totality of the assemblies.

2. The installation according to claim 1, including a plurality of sub-installations (10A; 10B), each sub-installation including a distinct sub-group of energy generation means and, when appropriate, energy storage means (56A; 56B), each sub-installation being electrically connected to at least one element or a portion of an element (12A; 12B) that is not supplied by at least one other installation.

3. The installation according to claim 2, wherein at least two sub-installations (10A; 10B) are each electrically connected to a distinct portion of the building (12A; 12B), at least one of the sub-installations also being connected to at least one other element to be powered (20) other than the building, said sub-installation including:
  means (58A, 58B, 62A, 62B) for interconnecting the storage means and/or the generation means of said sub-installation to the elements to be powered (12A, 12B, 20);
  means (72A, 72B) for measuring at least one parameter relating to the energy stored in the energy storage means of said sub-installation, and
  means (66A, 66B, 68A, 68B) for controlling the interconnection means depending on the values obtained by the measuring means, so that if the energy stored in the storage means of said sub-installation is less than a threshold value, electrical power supply to at least one of the elements (20, 30) connected to said sub-installation, other than the building, is prohibited.

4. The installation according to claim 3, wherein at least one safety interconnection means (75) is configured so that when it is activated, the energy coming from the generation means of a first sub-installation supplies the element or the portion of the element belonging to a second sub-installation.

5. The installation according to claim 1, including a plurality of elements (20, 30) to be powered other than the building (12), means (76A, 76B) for measuring at least one parameter ($I_{76A}$, $I_{76B}$) relating to the power required by each of the elements to be powered, and means (92) for determining the element among the elements other than the building to which power supply is prohibited depending on the values obtained by said measuring means.

6. The installation according to claim 1, wherein the energy generation means comprise at least one photovoltaic panel (16) capable of converting solar radiation into electrical energy.

7. The installation according to claim 6, wherein the surface area of the photovoltaic panels (16) and particularly of the roof (14) is greater than 100 m² and can supply more than 60 kWh in one day of insolation so that the photovoltaic panels can supply the building (12) with electricity without interruption for 24 hours.

8. The installation according to claim 1, wherein at least one charger (50; 50A, 50B, 50C) comprising a DC converter (52) is placed downstream of the energy generation means (16) and in particular interposed between the energy generation means (16) and the energy storage means (56; 56A, 56B).

9. The installation according to claim 1, wherein a DC/AC converter (54, 60; 54A, 54B, 60A, 60B) is placed between the energy generation means (16) and the elements (12, 20, 30) to be powered, particularly at the output of the energy storage means (56; 56A, 56B).

10. The installation according to claim 1, wherein the energy generation means (16) are connected both to the energy storage means (56; 56A, 56B) and directly to at least one of the elements to be powered (12, 20; 12A, 12B, 20) and particularly to the building.

11. The installation according to claim 1, also connected to an emergency power supply means, such as a generator set or an electrical distribution grid (80), designed to supply at least one of the elements and/or at least partially the energy storage means.

12. The installation according to claim 1, wherein the electricity distribution terminal (20) includes a connection detecting means for the presence of an electrical device at the connection means (22) of the terminal, and control means (66, 67, 68; 66A, 66B, 68A) for the interconnection means (58, 62, 64; 58A, 58B, 62A) interposed between the terminal and the energy storage means depending on the detection means.

13. The installation according to claim 1, wherein the terminal includes an identification module (28A) and/or a payment module (28B).

14. The installation according to claim 13, wherein the control means (67, 68; 68A) control the interconnection means (62, 64; 62A) interposed between the terminal and the energy storage means depending on the identification and/or payment modules.

15. The installation according to claim 13, wherein the terminal includes access means (24) movable between a closed position allowing access to the connection means (22) to be blocked and an open position allowing free access to the connection means, and control means for the access means depending on the identification module and/or the payment module.

16. The installation according to claim 12, including control means (67, 68; 68A) for the interconnection (62, 64; 62A) or access means relative to at least one connection means (22) of the terminal depending on the parameter relating to the energy available in at least one portion of the energy storage means.

17. The installation according to claim 1, wherein another element to be powered of the installation is a water treatment unit (30) such as a water purification and/or seawater desalination element.

18. The installation according to claim 17, wherein the water treatment element includes a fluid output channel (34, 36) connected to the building (12) and is designed to supply the latter with water and/or is connected to a liquid distribution terminal (38) located outside the building and including liquid delivery means such as a faucet (39).

19. The installation according to claim 18, wherein the liquid distribution terminal includes and identification module and/or a payment module and possibly access means movable between a closed position allowing access to the delivery means to be blocked and an open position allowing free access to the delivery means, and control means for the access means depending on the operation of the identification module and/or the payment module.

20. The installation according to claim 18, including opening and closing means (40) for at least one fluid channel (34), such as at least one valve, and means for controlling the opening and closing means depending on at least one parameter, so that only the building is supplied with water when the value of the parameter is outside a certain range of threshold values.

21. A method (100; 200) for managing an installation (10) capable of being electrically autonomous comprising elements to be powered (12, 20, 30) including:
a building (12) including at least one room delimited by at least a wall and a roof, and
an electricity distribution terminal (20) located outside the building and including connection means for the connection of at least one external electrical device,
the installation including power supply means for the elements comprising:
means for generating energy from a natural source (16),
means for storing energy (56; 56A, 56B),
means (58, 62, 64; 58A, 58B, 62A, 62B) for interconnecting the storage means and/or generation means to the elements to be powered,
the method including the following steps:
measuring at least one parameter relating to the energy available in each storage assembly of a plurality storage assembly in parallel, and
determining the energy stored in a plurality or the totality of the assemblies, ordering (120, 122; 210, 212, 218, 220) the interconnection means (58, 62, 64; 58A, 58B, 62A, 62B) depending on the measured values, so that if the energy available in at least one portion of the storage means is less than a threshold value, power supply to at least one of the elements other than the building is prohibited.

22. An installation (10) capable of being electrically autonomous including elements to be powered (12, 20, 30) including:
a building (12) including at least one room delimited by at least a wall and a roof (14), and
an electricity distribution terminal (20) located outside the building and including connection means (22) for connection of at least one external electrical device,
the installation including means for powering the elements comprising:
means for generating energy (16) from a natural source,
means for storing energy (56; 56A, 56B),
means (58, 62, 64; 58A, 58B, 62A, 62B) for interconnecting the storage means and/or the generation means to the elements to be powered,
the installation also includes:

means (72; 72A, 72B) for measuring at least one parameter ($I_{72}$; $I_{72A}$, $I_{72B}$) relating to the energy stored in at least one portion of the energy storage means, and means (66, 68, 67; 66A, 66B, 68A, 68B) for controlling the interconnection means depending on the values obtained by the measuring means, so that if the energy stored in the at least one portion of the storage means is less than a threshold value, electrical power supply to at least one of the elements (20, 30) other than the building is prohibited, wherein said installation further includes a plurality of sub-installations (10A; 10B), each sub-installation including a distinct sub-group of energy generation means and, when appropriate, energy storage means (56A; 56B), each sub-installation being electrically connected to at least one element or a portion of an element (12A; 12B) that is not supplied by at least one other installation, wherein at least two sub-installations (10A; 10B) are each electrically connected to a distinct portion of the building (12A; 12B), at least one of the sub-installations also being connected to at least one other element to be powered (20) other than the building, said sub-installation including.

23. The installation according to claim 22, wherein at least one safety interconnection means (75) is configured so that when it is activated, the energy coming from the generation means of a first sub-installation supplies the element or the portion of the element belonging to a second sub-installation.

24. An installation (10) capable of being electrically autonomous including elements to be powered (12, 20, 30) including:
a building (12) including at least one room delimited by at least a wall and a roof (14), and
an electricity distribution terminal (20) located outside the building and including connection means (22) for connection of at least one external electrical device,
the installation including means for powering the elements comprising:
means for generating energy (16) from a natural source,
means for storing energy (56; 56A, 56B),
means (58, 62, 64; 58A, 58B, 62A, 62B) for interconnecting the storage means and/or the generation means to the elements to be powered,
the installation also includes:
means (72; 72A, 72B) for measuring at least one parameter ($I_{72}$; $I_{72A}$, $I_{72B}$) relating to the energy stored in at least one portion of the energy storage means, and
means (66, 68, 67; 66A, 66B, 68A, 68B) for controlling the interconnection means depending on the values obtained by the measuring means, so that if the energy stored in the at least one portion of the storage means is less than a threshold value, electrical power supply to at least one of the elements (20, 30) other than the building is prohibited,
wherein the energy generation means comprise at least one photovoltaic panel (16) capable of converting solar radiation into electrical energy, and wherein the surface area of the photovoltaic panels (16) and particularly of the roof (14) is greater than 100 m$^2$ and can supply more than 60 kWh in one day of insolation so that the photovoltaic panels can supply the building (12) with electricity without interruption for 24 hours.

25. An installation (10) capable of being electrically autonomous including elements to be powered (12, 20, 30) including:
a building (12) including at least one room delimited by at least a wall and a roof (14), and
an electricity distribution terminal (20) located outside the building and including connection means (22) for connection of at least one external electrical device,
the installation including means for powering the elements comprising:
means for generating energy (16) from a natural source,
means for storing energy (56; 56A, 56B),
means (58, 62, 64; 58A, 58B, 62A, 62B) for interconnecting the storage means and/or the generation means to the elements to be powered,
the installation also includes:
means (72; 72A, 72B) for measuring at least one parameter ($I_{72}$; $I_{72A}$, $I_{72B}$) relating to the energy stored in at least one portion of the energy storage means, and
means (66, 68, 67; 66A, 66B, 68A, 68B) for controlling the interconnection means depending on the values obtained by the measuring means, so that if the energy stored in the at least one portion of the storage means is less than a threshold value, electrical power supply to at least one of the elements (20, 30) other than the building is prohibited,
wherein the terminal includes an identification module (28A) and/or a payment module (28B), and wherein the control means (67, 68; 68A) control the interconnection means (62, 64; 62A) interposed between the terminal and the energy storage means depending on the identification and/or payment modules.

26. An installation (10) capable of being electrically autonomous including elements to be powered (12, 20, 30) including:
a building (12) including at least one room delimited by at least a wall and a roof (14), and
an electricity distribution terminal (20) located outside the building and including connection means (22) for connection of at least one external electrical device,
the installation including means for powering the elements comprising:
means for generating energy (16) from a natural source,
means for storing energy (56; 56A, 56B),
means (58, 62, 64; 58A, 58B, 62A, 62B) for interconnecting the storage means and/or the generation means to the elements to be powered,
the installation also includes:
means (72; 72A, 72B) for measuring at least one parameter ($I_{72}$; $I_{72A}$, $I_{72B}$) relating to the energy stored in at least one portion of the energy storage means, and
means (66, 68, 67; 66A, 66B, 68A, 68B) for controlling the interconnection means depending on the values obtained by the measuring means, so that if the energy stored in the at least one portion of the storage means is less than a threshold value, electrical power supply to at least one of the elements (20, 30) other than the building is prohibited,
wherein another element to be powered of the installation is a water treatment unit (30) such as a water purification and/or seawater desalination element, and wherein the water treatment element includes a fluid output channel (34, 36) connected to the building (12) and is designed to supply the latter with water and/or is connected to a liquid distribution terminal (38) located outside the building and including liquid delivery means such as a faucet (39).

27. The installation according to claim 26, wherein the liquid distribution terminal includes and identification module and/or a payment module and possibly access means movable between a closed position allowing access to the delivery means to be blocked and an open position allowing free access to the delivery means, and control means for the access means depending on the operation of the identification module and/or the payment module.

\* \* \* \* \*